(12) United States Patent
Ghelmansarai

(10) Patent No.: US 6,373,062 B1
(45) Date of Patent: *Apr. 16, 2002

(54) INTERDIGITAL PHOTODETECTOR FOR INDIRECT X-RAY DETECTION IN A RADIOGRAPHY IMAGING SYSTEM

(75) Inventor: Farhad Abbasi Ghelmansarai, Walnut Creek, CA (US)

(73) Assignee: Siemens Medical Solutions USA, Inc., Iselin, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/343,313

(22) Filed: Jun. 30, 1999

(51) Int. Cl.[7] .................................................. G01T 1/24
(52) U.S. Cl. ............................. 250/370.09; 250/370.01
(58) Field of Search ....................... 250/370.01, 370.08, 250/370.09, 370.1

(56) References Cited

U.S. PATENT DOCUMENTS

| | | | | |
|---|---|---|---|---|
| 4,724,323 A | * | 2/1988 | Fukaya et al. | 250/370.15 |
| 4,775,880 A | * | 10/1988 | Suzuki et al. | 348/302 |
| 5,017,989 A | * | 5/1991 | Street et al. | 257/291 |
| 5,117,114 A | * | 5/1992 | Street et al. | 250/370.11 |
| 5,587,591 A | * | 12/1996 | Kingsley et al. | 257/59 |
| 5,666,395 A | * | 9/1997 | Tsukamoto et al. | 378/98.4 |
| 5,677,538 A | * | 10/1997 | Moustakas et al. | 250/370.12 |
| 5,818,898 A | * | 10/1998 | Tsukamoto et al. | 378/98.8 |
| 5,852,296 A | * | 12/1998 | Tsukamoto et al. | 250/370.09 |

OTHER PUBLICATIONS

"New Amorphous–Silicon Image Sensor for X–Ray Diagnostic Medical Imaging Applications", R. L. Weisfield, M. A. Hartney, dpiX, Inc., A Xerox New Enterprise Co.; R.A. Street, R.B. Apte, Xerox Palo Alto Research Center.

"Demonstration of Megavoltage and Diagnostic X–Ray Imaging with Hydrogenated Amorphous Silicon Arrays", Medical Physics, vol. 10, No. 6, Nov./Dec. 1992, L.E. Antonuk, J. Boudry, W. Huang, et al.

* cited by examiner

Primary Examiner—Robert H. Kim
Assistant Examiner—Allen C. Ho

(57) ABSTRACT

System and method aspects for a photoconductive element for a radiography imaging system are described. The photoconductive element includes a conducting layer for absorbing photons generated indirectly from radiation passing through an object being imaged by the radiography imaging system. Also included is an interdigital contact structure in the conducting layer.

17 Claims, 3 Drawing Sheets

INTERDIGITAL PHOTODETECTOR FOR INDIRECT X-RAY DETECTION IN A RADIOGRAPHY IMAGING SYSTEM

RELATED APPLICATIONS

The present application is related to U.S. patent application Ser. No. 09/343,307, now U.S. Pat. No. 6,281,507, entitled AN INTERDIGITAL PHOTOCONDUCTOR STRUCTURE FOR DIRECT X-RAY DETECTION IN A RADIOGRAPHY IMAGING SYSTEM (filed Oct. 30, 2001 on even date herewith), and assigned to the assignee of the present invention.

FIELD OF THE INVENTION

The present invention relates to radiography imaging systems, and more particularly to an interdigital structure for a photoconductive detector in a radiography imaging system.

BACKGROUND OF THE INVENTION

Traditionally, medical diagnostic processes record x-ray image patterns on silver halide films. These systems direct an initially uniform pattern of interrogating x-ray radiation through a patient to be studied, intercept the consequently imagewise modulated pattern of x-ray radiation with an x-ray radiation intensifying screen, record the intensified pattern in a silver halide film, and chemically transform the latent radiation pattern into a permanent and visible image called a radiogram.

Radiograms have also been produced by using layers of radiation sensitive materials to directly capture radiographic images as imagewise modulated patterns of electrical charges. Depending upon the intensity of the incident X-ray radiation, electrical charges generated either electrically or optically by the X-ray radiation within a pixelized area are quantized using a regularly arranged array of discrete solid state radiation sensors.

There has been rapid development of large area, flat panel, digital x-ray imaging detectors for digital radiology using active matrix technologies. An active matrix consists of a two-dimensional array of thin film transistors (TFTs) made with amorphous or polycrystalline semiconductor materials. There are two general approaches to making flat-panel x-ray detectors, direct or indirect. The direct method is also referred to as a self-scanned α-Se (amorphous selenium). The indirect method uses phosphor screens or other scintillators, e.g., cesium iodide (CsI), to first convert x-rays to visible light, which is then read out with an active matrix array with an additional light sensor, i.e., a photodiode, at each pixel of the array.

While achieving advantages over traditional film radiography, photodiode use in x-ray imaging has its share of difficulties. In the indirect method, the use of photodiodes presents size limitations, complex design and therefore high cost. The minimal pixel size for developed photodiode flat panel is about 125 micron by 125 micron. Unfortunately, the size limitations restrict the resolution of the array. Accordingly, a need exists for a photodetector structure that reduces these problems in a flat-panel radiographic detector.

SUMMARY OF THE INVENTION

The present invention meets this need and provides system and method aspects for a photoconductive element for a radiography imaging system. The photoconductive element includes a conducting layer for absorbing photons generated indirectly from radiation passing through an object being imaged by the radiography imaging system. Also included is an interdigital contact structure in the conducting layer.

The interdigital contact structure for electrodes in accordance with the present invention reduces the gap between electrodes, which results in a negligible photoconductive lag. Also, a small electrode gap supports an increase in the gain of the detector, since the gain is inversely proportional to the distance between the electrodes. Further, the interdigital structure of the present invention is simpler and correspondingly less expensive in comparison to a traditional photodiode structure. These and other advantages of the aspects of the present invention will be more fully understood in conjunction with following detailed description and accompanying drawings.

DETAILED DESCRIPTION OF THE INVENTION

The present invention relates to interdigital photoconductor for a radiography imaging system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be merely limited to the embodiment shown but is to be accorded the widest scope consistent with the principles and features described herein.

Figure 1:
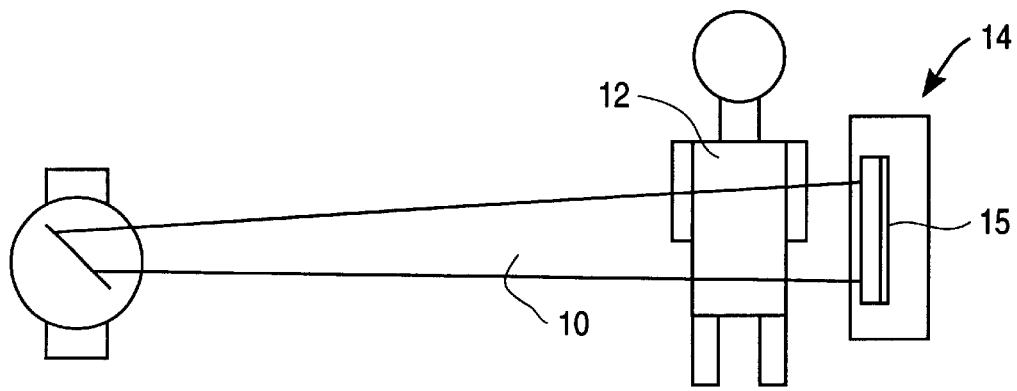
FIG. 1 illustrates a general diagram of a radiographic imaging environment in accordance with the present invention.

FIG. 1 illustrates a general diagram of a radiographic imaging environment in accordance with the present invention. As shown, x-ray signals 10 are transmitted toward an object 12, e.g., a patient, for imaging by a radiography system 14. In the present invention, radiography system 14 utilizes flat panel, active matrix technologies with an indirect method approach to achieve the imaging of object 12, as described in greater detail with reference to FIGS. 2 and 3. In general, the object 12 to be imaged is positioned between a radiation source and the radiography system 14. Megavoltage or diagnostics x-rays 10 which pass through the object 12 interact with the radiography system 14 generating light photons as they pass through a phosphor screen or scintillator 15, such as CsI or CaWO$_4$ (Calcium Tungsten Oxide) scintillator. For megavoltage radiation, the low cross section associated with the high energy photons requires that a metal plate be present to provide sufficient interactions. With the passage of secondary high energy electrons through the phosphor screen to create visible light photons, the absorbed light photons generate electron-hole pairs which draft under the influence of an applied electric voltage.

Figure 2:
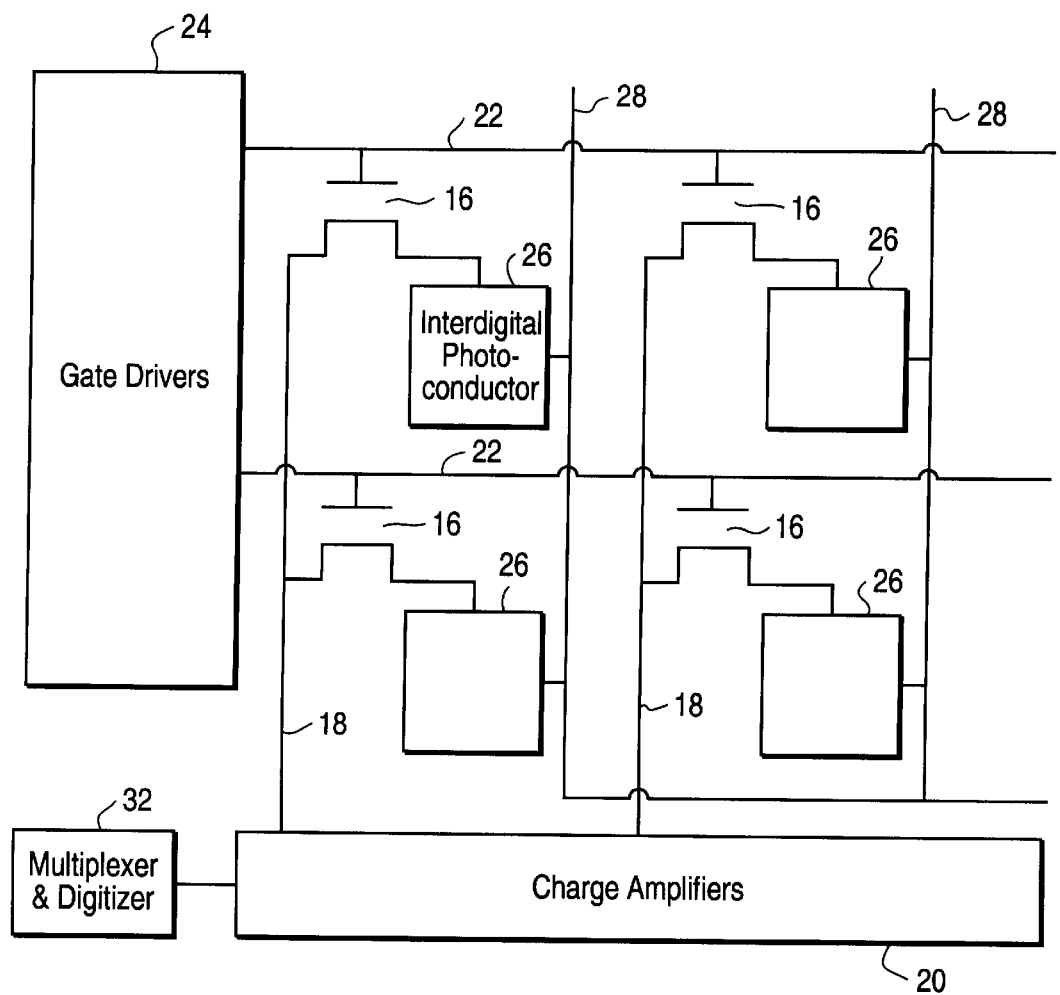
FIG. 2 illustrates a two-dimensional array structure in accordance with the present invention.

Within the radiography system 14 is a two-dimensional array structure illustrated by the block diagram of FIG. 2.

TFTs 16 are coupled by data lines 18 at their sources to a charge amplifier circuit 20. Gate lines 22 from a gate driver circuit 24 are coupled to the gates of the TFTs 16. The present invention further includes interdigital photoconductors 26 that are coupled between the TFTs 16 and a bias voltage 28. Also included in the array structure is a multiplexer and digitizer unit 32 that multiplexes and converts the analog signals from the charge amplifiers into digital signals for further image processing, as is well understood by those skilled in the art.

Figure 3:
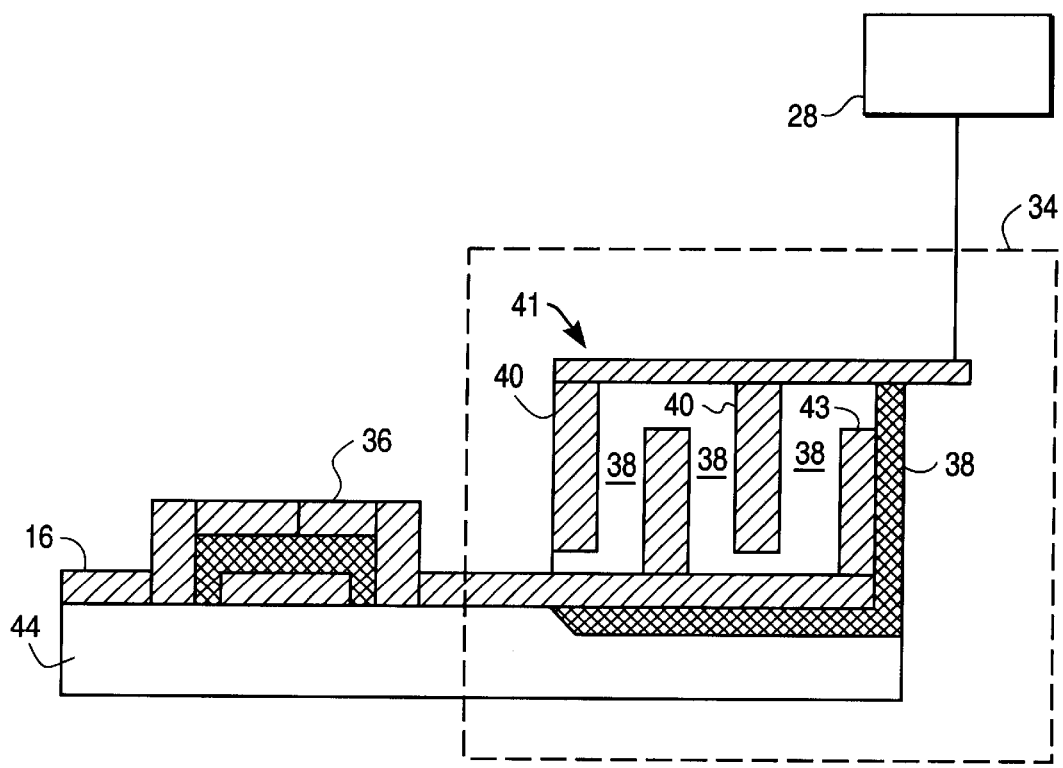
FIG. 3 illustrates an interdigital photoconductor of the two-dimensional array structure.

FIG. 3 illustrates the interdigital photoconductor 26 of the present invention in greater detail. Within each interdigital photoconductor 26 are a photoconductor element 34 and a storage capacitor 36. The photoconductor element 34 is formed with a conducting layer 38, e.g., hydrogenated amorphous silicon ($\alpha$—Si:H) on a glass substrate 44, with an interdigital contact structure 41. As an alternate, the conducting layer 38 is formed with amorphous selenium. The interdigital contact structure 41 is formed by depositing metallic electrodes 40, 43 in an interdigital pattern on the surface of the conducting layer 38, where the number of electrodes is dependent upon specific design needs, including the x-ray energy, electric field between electrodes and the gain bandwidth product of photoconductive element 34. The interdigital contact structure 41 comprises a patterned plurality of electrodes 40 and 43, where electrode 40 is connected to the positive output of power supply 28, and electrode 43 is coupled to the storage capacitor 36, and the other electrode of storage capacitor is connected to ground. The contact structure 41 can be made transparent in order to increase the fill factor.

Photons absorbed by the conducting layer 38 release charge carriers (electron-hole pairs) which are separated and drawn to the electrodes 40 and 43 by the electric field created by the application of an electric voltage by the power supply 28. The collected charges by the electrodes 43 are stored on the storage capacitor 36. During read out, the TFTs 16 (FIG. 2) are turned on one row at a time to transfer the image charge from the storage capacitors 36 to the data lines 18 of the photoconductors 26 and then to the charge amplifiers 20.

Figure 4:
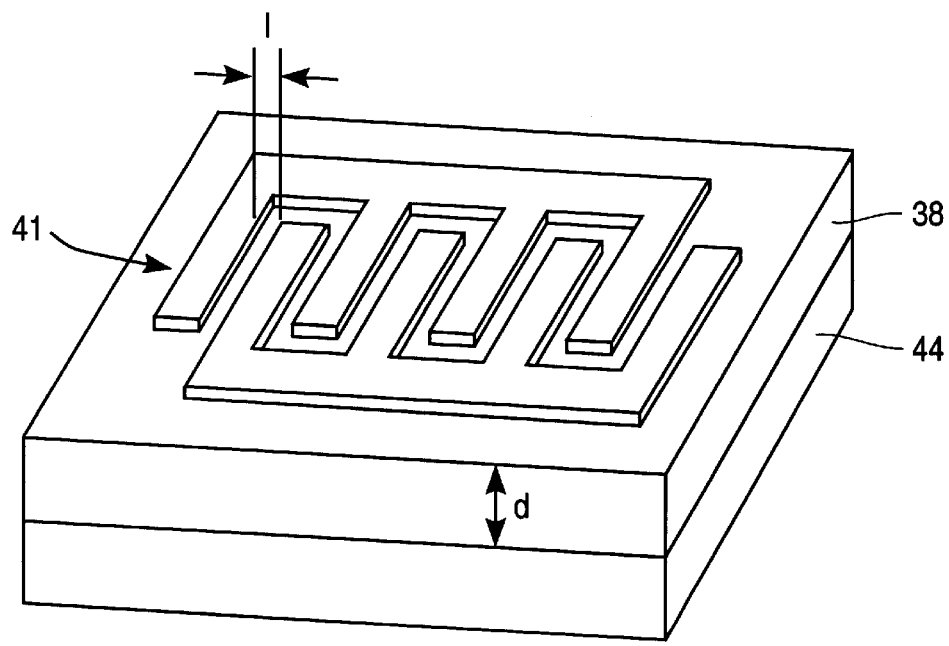
FIG. 4 illustrates a photoconductor element of the interdigital photoconductor in greater detail.

FIG. 4 illustrates the photoconductor element 34 in greater detail. With the interdigital contact structure 41 on the surface of the photoconducting layer 38 and alternate electrodes connected to the power supply 28, the carriers generated in the conducting layer 38 have a shorter distance to travel before being collected. For the conducting layer 38 of □-Si:H, about $10^{15}$ dangling bond states per $cm^3$ is estimated with the mobilities of electrons to holes being 2 and 0.01 $cm^2NxS$, respectively. A large difference between the mobilities of the electrons and holes leads to a large intrinsic photoconductive gain if metallic electrodes form ohmic contacts. However forming ohmic contacts would increase the dark current noise. Therefore, blocking contacts could be used to decrease the dark current. The conducting layer 38 preferably has a thickness (d) of a few micron, e.g., about 2 micron, while the length, I, of the layer between the electrodes is determined by the required resolution and gain-bandwidth product of the photodetector.

The frequency response, or bandwidth, of the conducting layer 38 generally refers to the activity of a single generated electron-hole pair Once the carriers are moving toward the opposite electrodes, the current created persists until both carriers are collected at the electrodes or until they recombine in the bulk of the semiconductor. Thus, the time for detection of the current is limited by the transit time between the electrodes for the fastest charge carrier. In such cases, the highest frequency to which the conducting layer 38 can respond, i.e., its maximum bandwidth, depends directly on minimizing the distance that the electrons must travel between electrodes. Although the electron is collected almost immediately at the anode, the hole continues to drift in the conducting layer. The absence of the electron and continued presence of the hole result in a net positive charge in the conducting layer. If metallic electrodes form ohmic contacts, the excess charge draws a second electron from the cathode into the layer, which in turn speeds toward the anode. Thus, fast electrons continue to be drawn into the conducting layer until the hole is either collected at the cathode or recombines with an electron. The excess current of electrons is referred to as photocurrent gain.

With the use of an interdigital structure in accordance with the present invention, the gap between electrodes is reduced, which produces a negligible photoconductive lag. Also, a small electrode gap supports an increase in the gain of the detector, since the gain is inversely proportional to the distance between the electrodes. An increase in the signal to noise ratio (S/N) of the imaging system is thus realized, while reducing the bias voltage for a certain electric field. Further, the interdigital structure of the present invention is simpler and correspondingly less expensive in comparison to the traditional photodiode structure, which typically requires a doped-intrinsic-doped structure of n-doped, p-doped, and intrinsic amorphous silicon. In addition, the pixel size for the interdigital structure offers smaller size requirements than that of the photodiode structure, thus achieving a finer imaging resolution.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A photoconductive element for a radiography imaging system, the photoconductive element comprising:
   a conducting layer for absorbing photons generated indirectly from radiation passing through an object being imaged by the radiography imaging system; and
   an interdigital contact structure on a single surface in the conducting layer.

2. The photoconductive element of claim 1 wherein the interdigital contact structure further comprises a first plurality of electrodes coupled together and a second plurality of electrodes coupled together, wherein the first and second plurality of electrodes are substantially parallel to each other.

3. The photoconductive element of claim 2 wherein the first plurality of electrodes is coupled to the positive output of a power supply via a first electrode contact and the second plurality of electrodes is coupled to a storage capacitor via a second electrode contact.

4. The photoconductive element of claim 3 wherein the storage capacitor is further coupled to a thin film transistor.

5. The photoconductive element of claim 1 wherein the conducting layer further comprises hydrogenated amorphous silicon.

6. The photoconductive element of claim 1 wherein the conducting layer further comprises amorphous selenium.

7. A method for providing a photoconductive element for a radiography imaging system, the method comprising:
   utilizing a conducting layer for absorbing photons generated indirectly from radiation passing through an object being imaged by the radiography imaging system; and providing an interdigital contact structure on a single surface in the conducting layer.

8. The method of claim 7 wherein providing an interdigital contact structure further comprises providing a first plurality of electrodes coupled together and providing a second plurality of electrodes coupled together, wherein the first plurality of electrodes and the second plurality of electrodes are substantially parallel to each other.

9. The method of claim 8 further comprising coupling the first plurality of electrodes to a power supply via a first electrode contact and coupling the second plurality of electrodes to a storage capacitor via a second electrode contact.

10. The method of claim 7 wherein utilizing a conducting layer further comprises utilizing hydrogenated amorphous silicon.

11. The method of claim 7 wherein utilizing a conducting layer further comprises utilizing amorphous selenium.

12. A two-dimensional active matrix array x-ray detector for a radiography imaging system comprising:

a plurality of photoconductive elements responsive to photon absorption from photons generated indirectly from radiation passing through an object being imaged by the radiography imaging system in a photoconductive layer, each of the plurality of photoconductive elements including an interdigital contact structure on a single surface in the photoconductive layer;

a plurality of thin film transistors coupled to the plurality of photoconductive elements;

gate driver circuit driving a gate line of each thin film transistor;

charge amplifier circuit for amplifying a data signal from a source of each thin film transistor; and multiplexer and digitizer circuit for converting signals from the charge amplifier circuit to digital form for utilization in radiographic image formation.

13. The detector of claim 12 wherein each of the photoconductive elements further comprises a storage capacitor coupled to the interdigital contact structure.

14. The detector of claim 12 wherein the interdigital contact structure further comprises a first plurality of electrodes coupled together and a second plurality of electrodes coupled together, wherein the first and second plurality of electrodes are substantially parallel to each other.

15. The detector of claim 14 wherein the first plurality of electrodes is coupled to the power supply via a first contact electrode and the second plurality of electrodes is coupled to the storage capacitor via a second contact electrode.

16. The detector of claim 12 wherein the photoconductive layer further comprises amorphous hydrogenated silicon.

17. The detector of claim 12 wherein the photoconductive layer further comprises amorphous selenium.

* * * * *